(12) United States Patent
Kleinman

(10) Patent No.: US 11,038,694 B1
(45) Date of Patent: Jun. 15, 2021

(54) DEVICES, METHODS, AND SYSTEMS FOR CRYPTOGRAPHIC AUTHENTICATION AND PROVENANCE OF PHYSICAL ASSETS

(71) Applicant: Bruce Kleinman, Mountain View, CA (US)

(72) Inventor: Bruce Kleinman, Mountain View, CA (US)

(*) Notice: Subject to any disclaimer, the term of this patent is extended or adjusted under 35 U.S.C. 154(b) by 29 days.

(21) Appl. No.: 16/689,451

(22) Filed: Nov. 20, 2019

Related U.S. Application Data

(63) Continuation of application No. 15/681,779, filed on Aug. 21, 2017, now Pat. No. 10,523,443.

(60) Provisional application No. 62/379,177, filed on Aug. 24, 2016.

(51) Int. Cl.
| | |
|---|---|
| *H04L 29/06* | (2006.01) |
| *H04L 9/32* | (2006.01) |
| *H04W 12/06* | (2021.01) |
| *H04L 9/30* | (2006.01) |
| *H04L 9/08* | (2006.01) |
| *G06F 7/58* | (2006.01) |

(52) U.S. Cl.
CPC .......... *H04L 9/3247* (2013.01); *H04L 9/0861* (2013.01); *H04L 9/30* (2013.01); *H04L 9/3236* (2013.01); *H04L 9/3249* (2013.01); *H04L 9/3252* (2013.01); *H04L 9/3278* (2013.01); *H04W 12/06* (2013.01); *G06F 7/588* (2013.01); *H04L 2209/38* (2013.01); *H04L 2209/805* (2013.01)

(58) Field of Classification Search
CPC ..................................................... H04L 9/3247
See application file for complete search history.

(56) References Cited

U.S. PATENT DOCUMENTS

| | | | |
|---|---|---|---|
| 8,750,502 B2 | 6/2014 | Kirkpatrick | |
| 8,751,806 B1* | 6/2014 | Adler | H04L 9/3066 713/168 |
| 10,803,374 B2* | 10/2020 | Micali | G06Q 30/0185 |
| 2008/0256600 A1* | 10/2008 | Schrijen | G06F 21/60 726/2 |
| 2010/0293384 A1* | 11/2010 | Potkonjak | H04L 9/3278 713/176 |
| 2012/0128157 A1* | 5/2012 | Braun | H04L 9/3247 380/270 |

(Continued)

OTHER PUBLICATIONS

Devadas, Srinivas, et al. "Design and implementation of PUF-based" unclonable"RFID ICs for anti-counterfeiting and security applications." 2008 IEEE international conference on RFID. IEEE, 2008. (Year: 2008).*

(Continued)

*Primary Examiner* — Shawnchoy Rahman
(74) *Attorney, Agent, or Firm* — Mark Lauer; Silicon Edge Law Group LLP

(57) ABSTRACT

Authentication and provenance of physical assets may be achieved by attaching a cryptographically strong RFID tag including a physically unclonable function and public-key cryptography logic which implements a digital signature algorithm. The cryptographically strong RFID tag directly participates in a novel implementation of blockchain technology, constructing an indelible and cryptographically provable record of authenticity and provenance with a new level of trustworthiness to protect physical assets.

20 Claims, 12 Drawing Sheets

(56) References Cited

U.S. PATENT DOCUMENTS

| | | |
|---|---|---|
| 2013/0254636 A1 | 9/2013 | Kirkpatrick |
| 2016/0098723 A1 | 4/2016 | Feeney |
| 2016/0300234 A1 | 10/2016 | Moss-Pultz |
| 2019/0095668 A1 | 3/2019 | Gaathon |
| 2019/0213371 A1 | 7/2019 | Endress |

OTHER PUBLICATIONS

Tuyls, P. "RFID-Tags: Privacy and Security Issues." Philips Research (2006). (Year: 2006).*

Vigna, Brace for the Digital Money Wars, Wall Street Journal, Dec. 7, 2019, p. B5.

Mekic, NXP Blog, RFID for Blockchain, Sep. 11, 2019, 6 pages.

Hepp, et al., Securing Physical Assets on the Blockchain, CryBlock'18: 1st Workshop on Cryptocurrencies and Blockchains for Distributed Systems, Jun. 15, 2018, Munich, Germany. ACM, New York, NY, USA, 6 pages.

Aniello, et al.,Towards a Supply Chain Management System for Counterfeit Mitigation using Blockchain and PUF, arXiv:1908.09585v2 [cs.CR] Sep. 2, 2019, 33 pages.

Liang, et al., A double PUF-based RFID identity authentication protocol in service-centric internet of things environments, Information Sciences 503 (2019) 129-147, https://doi.org/10.1016/j.ins.2019.06.047, 19 pages.

\* cited by examiner

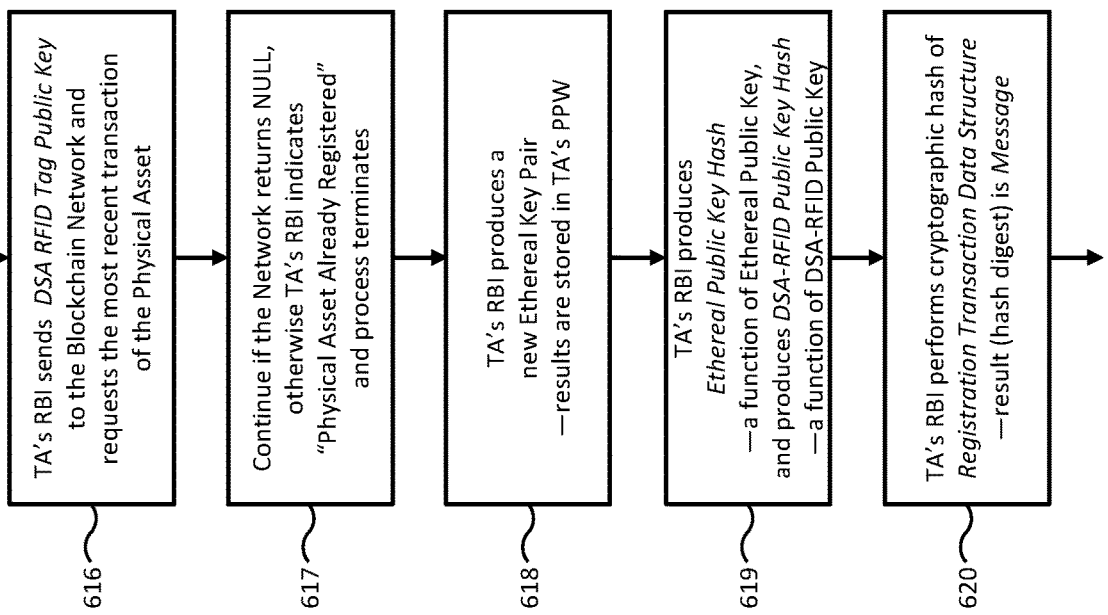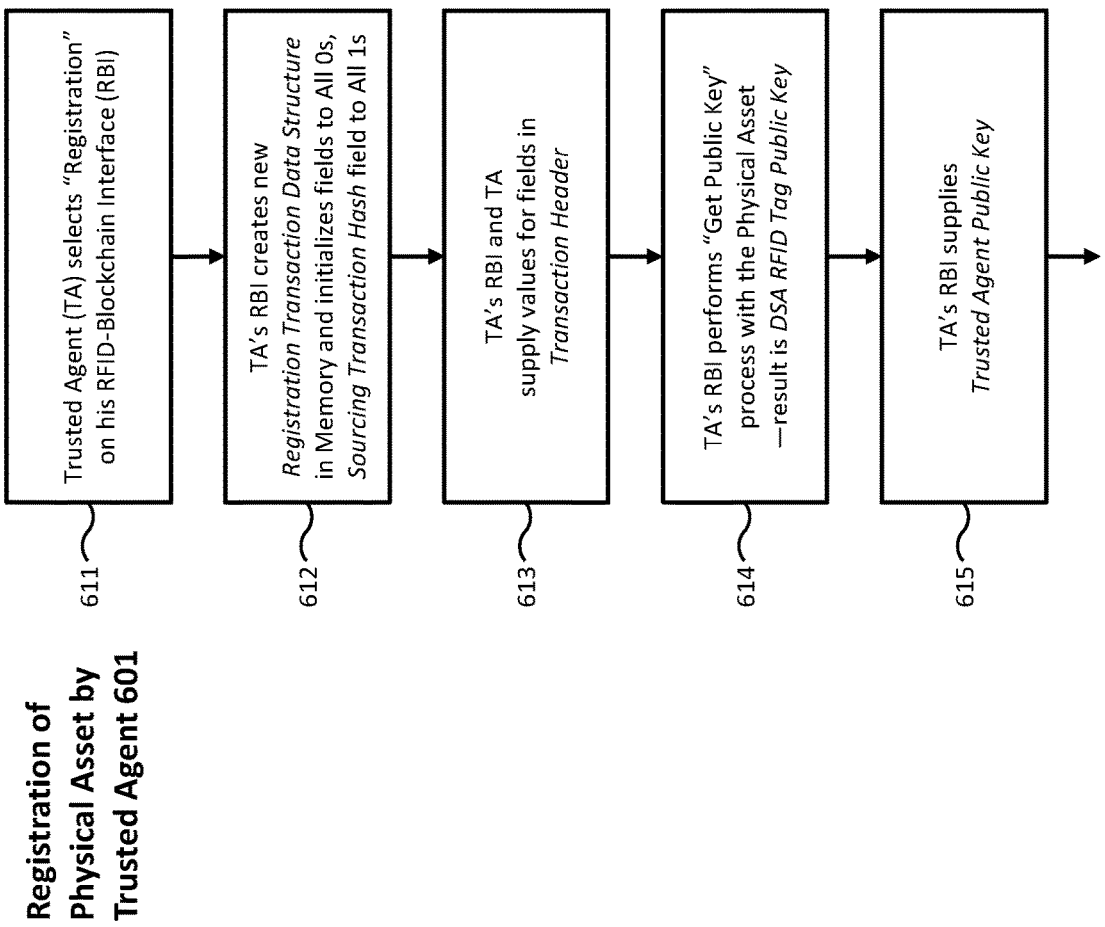
FIG. 6
Registration of Physical Asset by Trusted Agent 601

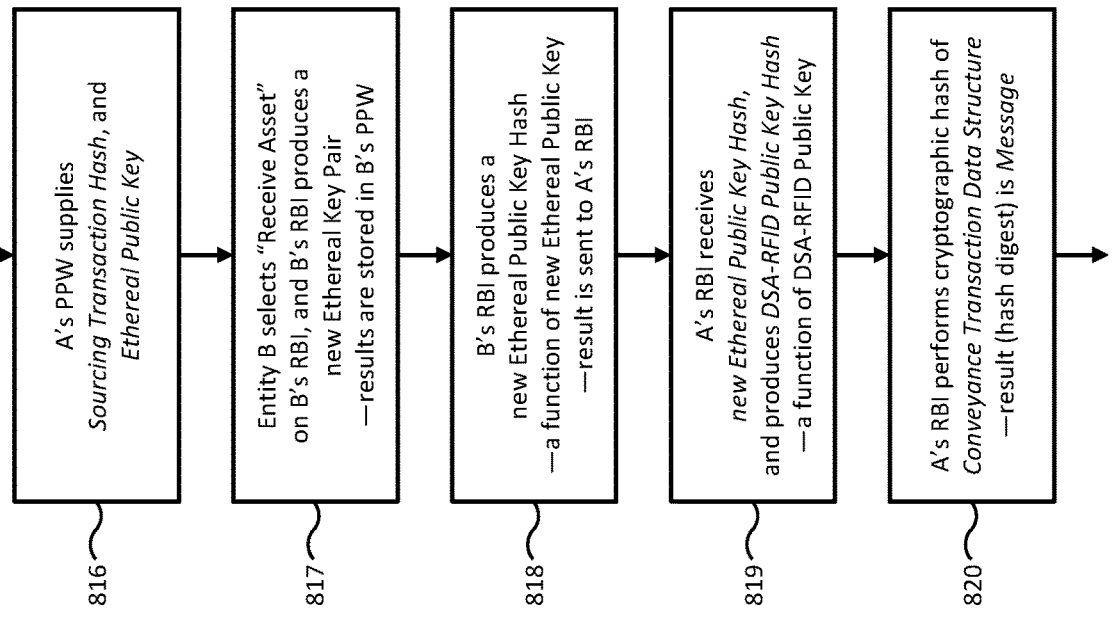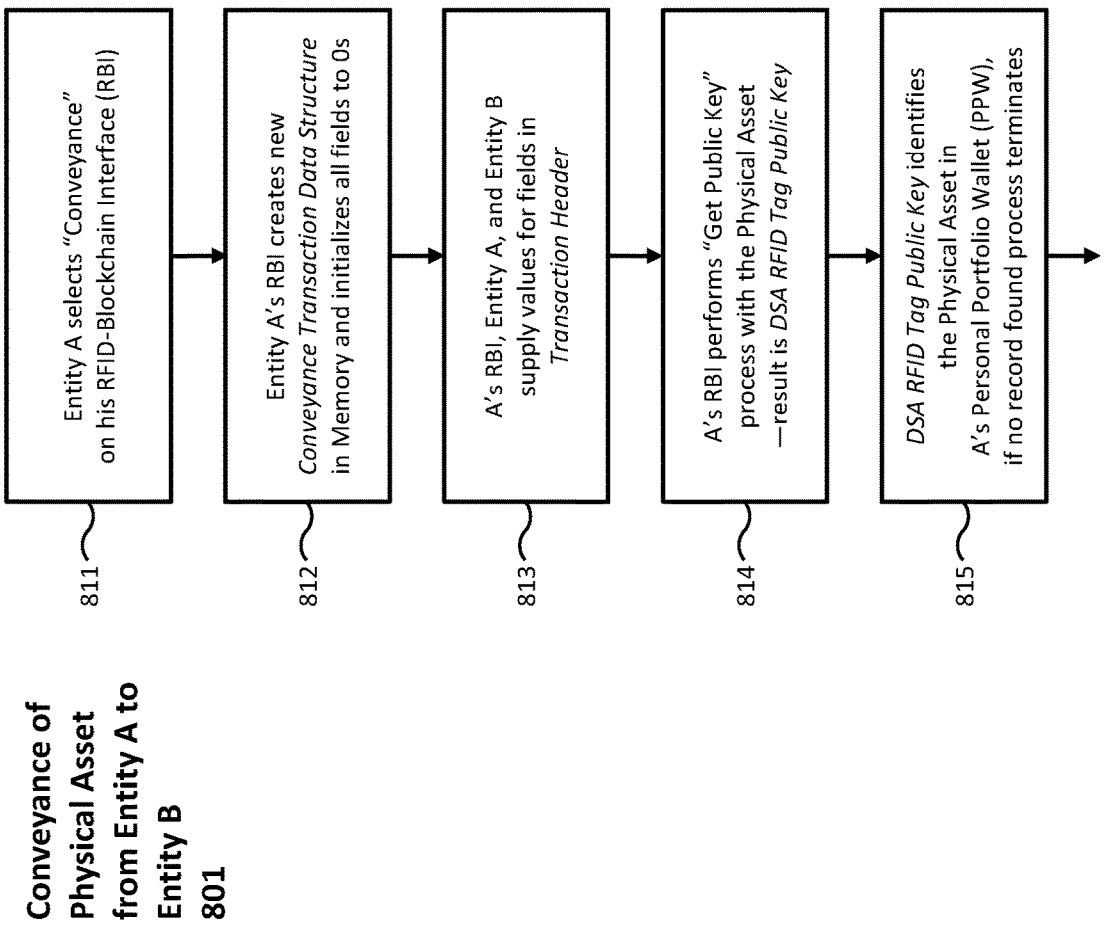
FIG. 8

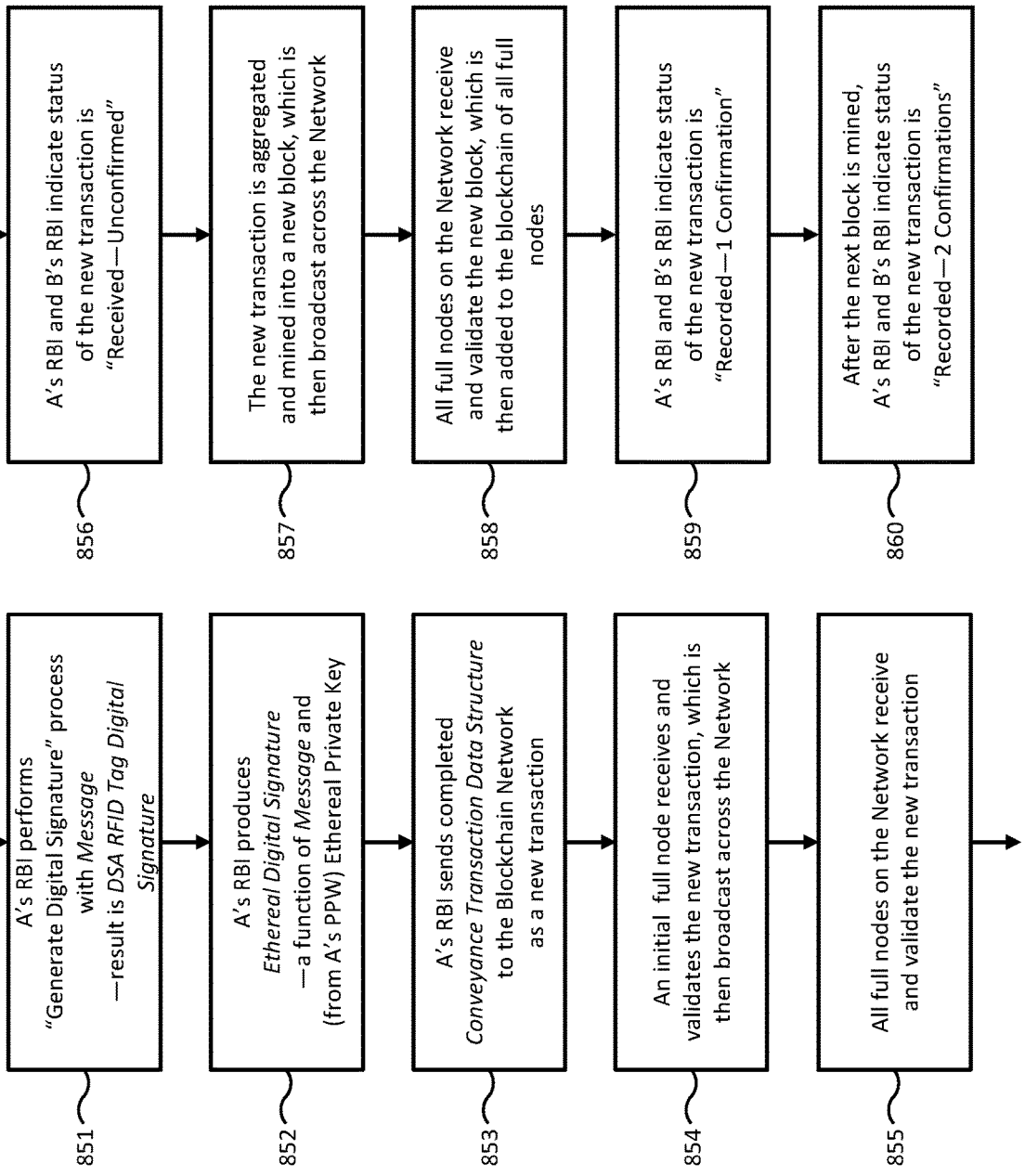

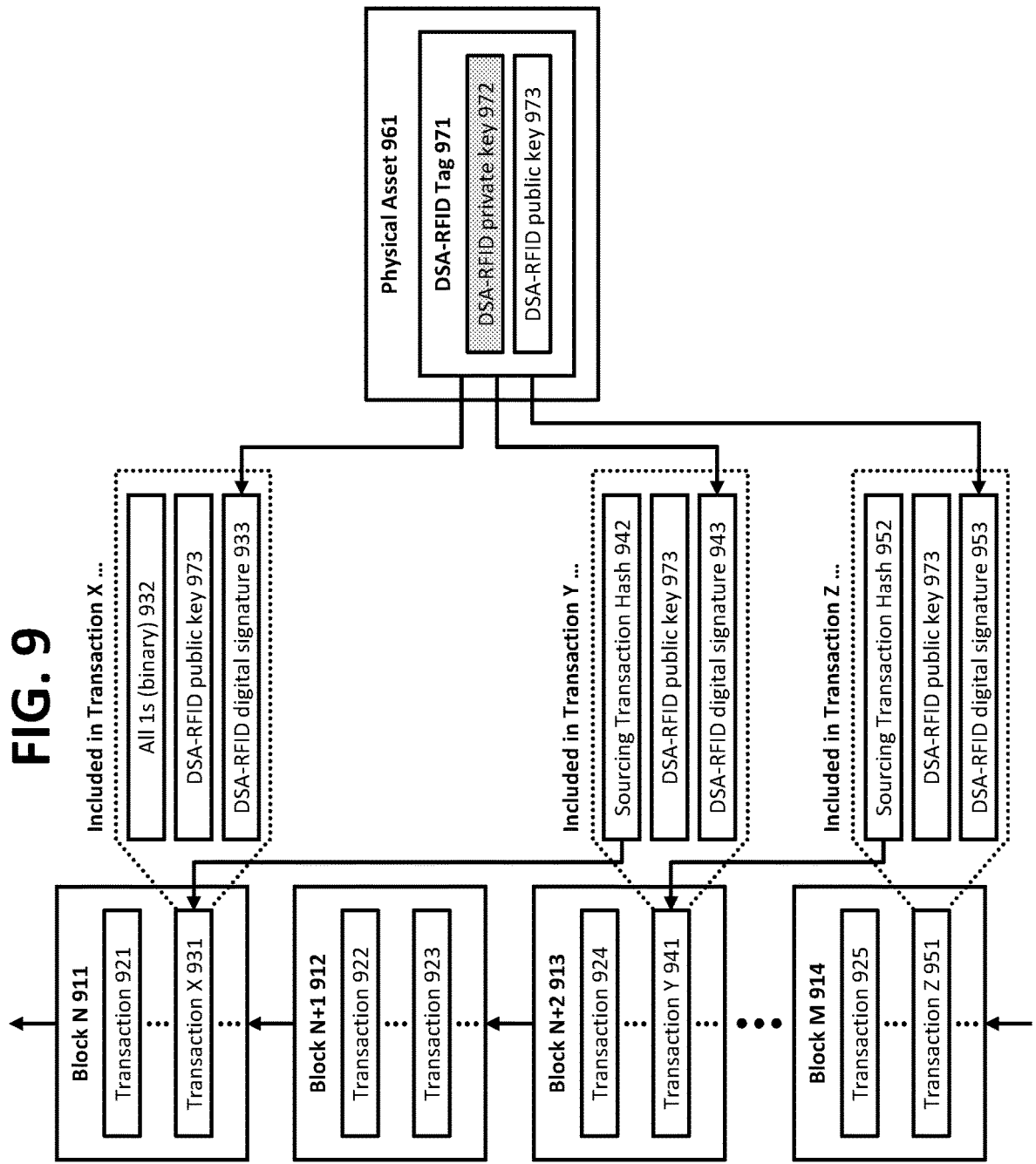

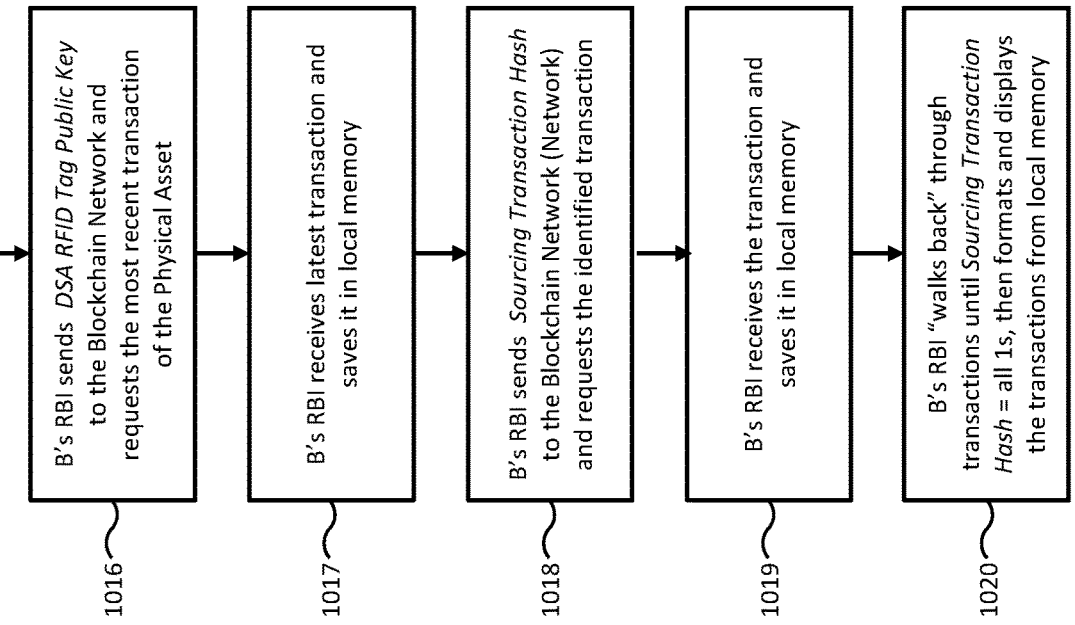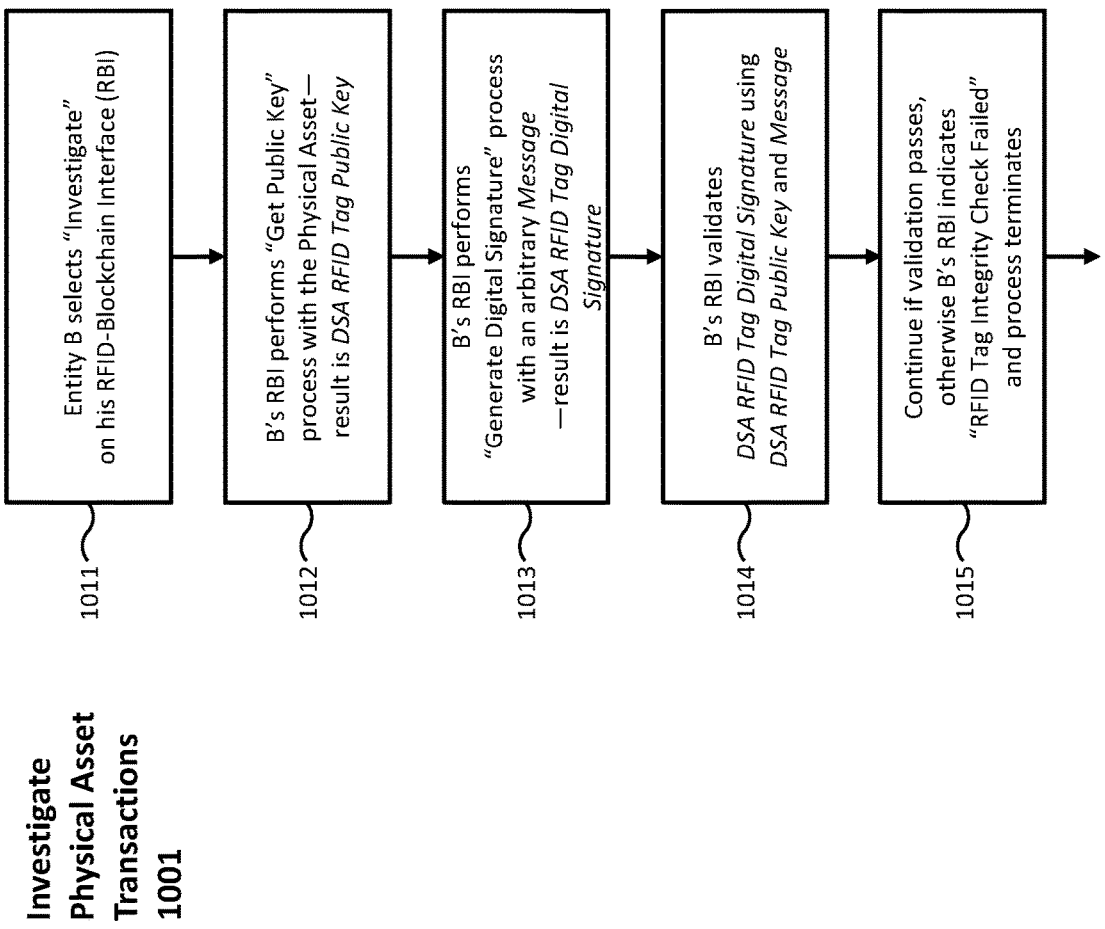
FIG. 10

DEVICES, METHODS, AND SYSTEMS FOR CRYPTOGRAPHIC AUTHENTICATION AND PROVENANCE OF PHYSICAL ASSETS

CROSS-REFERENCE TO RELATED APPLICATIONS

The present application is a continuation of U.S. application Ser. No. 15/681,779, filed Aug. 21, 2017, which in turn claims the benefit under 35 USC 119 of Provisional Application No. 62/379,177, filed Aug. 24, 2016, both prior applications having the same inventor and title as the present application and being incorporated by reference herein.

BACKGROUND AND SUMMARY

A great deal of attention is paid to protecting digital assets. For example, contemporary cryptography inhibits counterfeiting of Blu-Ray video discs and streaming video content. Contemporary cryptography also enables cryptocurrencies, securing the underlying store of value and ensuring trusted transactions.

Far less attention is paid to protecting physical assets. As a result, luxury goods fall victim to widespread counterfeiting. Moreover, industrial, medical, aerospace, and military equipment face risks that compromise integrity. Existing authentication solutions fall short of protecting high-value goods against sophisticated threats.

RFID tags may be employed to defend against these threats. The simplest RFID tags identify a physical asset by providing a serial number to a scanner device via electromagnetic waves. While useful for inventory purposes, such simple tags are easily cloned by copying legitimate serial numbers.

More advanced RFID tags hinder cloning by employing a challenge-response mechanism: the scanner sends a random challenge message to the RFID tag; the RFID tag performs a symmetric cryptography operation, a function of the challenge message and a the tag's copy of a shared key; the RFID tag returns the response to the scanner; the scanner sends the same challenge message to an online server; the online server performs the same symmetric cryptography operation with its copy of the shared key and returns the result to the scanner; the scanner compares the response from the RFID tag and the response from the online server; if the response values match, the RFID tag is authenticated.

In this scheme, each RFID tag is assigned a unique serial number and a unique shared key; during manufacturing, both values are programmed into the RFID tag and sent to the online server. This manufacturing step may be exploited by a threat actor, as the shared key can be observed during programming.

This scheme has a serious vulnerability that lessens long-term security: the online server is a tremendously attractive target, holding all credentials of all RFID tags. Once the online server is compromised, a threat actor can copy the database and clone the serial numbers and shared keys onto new RFID tags; the cloned RFID tags are indistinguishable from the real RFID tags. The likelihood of this threat increases over time: the online server must be available 24×7 to perform the challenge-response protocol described above (in cyber-security this is called the data at rest problem). Lastly, there is no remediation for RFID tags in the field: they cannot be re-programmed with new "uncompromised" shared keys. This serious vulnerability is inherent in systems that employ shared keys and symmetric cryptography.

A new type of cryptographically strong RFID tag disclosed herein eliminates the vulnerabilities of shared keys by having a robust identity. The RFID tag is attached to a physical asset and is designed to operate for the lifetime of the physical asset. Anti-tampering techniques may be employed to render the DSA-RFID tag permanently inoperable should it be removed from the physical asset.

A robust identity is unique, indelible, and unforgeable. A robust identity must have a practical means of expression and a practical means of authentication. Endowing each RFID tag with its own robust secret identity and a corresponding robust public identity meets these requirements.

The robust private identity and robust public identity are not programmed into the cryptographically strong RFID tag during manufacturing. Instead, a physically unclonable function (PUF) endows each RFID tag with a unique, unobservable, unclonable, and permanent robust secret identity. PUFs exploit variations inherent in the manufacture of semiconductor ICs to produce a statistically random output value that is different in every IC manufactured, including ICs manufactured on the same semiconductor wafer.

A PUF output cannot be observed by an attacker—during manufacturing or otherwise—attempting to copy private key values, thereby preventing cloning, reproduction, or emulation of a DSA-RFID tag. The robust secret identity—unique, indelible, and unforgeable—cannot be observed by any means; it is only used in calculations performed entirely within the RFID tag.

One such calculation performed within the RFID tag produces its robust public identity using a one-way mathematical function of the robust private identity. One-way mathematical functions are used in many contemporary cryptography systems: calculation in the forward direction is straightforward, while calculation in the reverse direction is so difficult as to be considered impossible.

Another calculation performed within the RFID tag provides a challenge-response mechanism. The response is produced by a one-way mathematical function of the input challenge and the robust private identity.

The robust public identity uniquely identifies the RFID tag, providing a means of expression for the robust identity. The robust public identity is also used in the challenge-response mechanism—validation of the response is a function of the input challenge message and the robust public identity—providing a means of authentication for the robust identity.

Moreover, an online service, disclosed herein, records the provenance of each physical asset, starting with binding the RFID tag to a trusted agent—such as the physical asset's manufacturer—and continuing with every conveyance of the physical asset. The recording of each conveyance adds great value: tracing ownership of in luxury goods is highly desirable; movement of industrial, medical, aerospace, and military equipment is essential to supply chain assurance.

Implementing a record of provenance using an online server presents a potential single point of failure and vulnerability. Implementing this record as a distributed redundant system may remove the single point of failure, though it creates additional points of vulnerability (in cyber-security this is called a larger attack surface).

The present disclosure includes a novel implementation of blockchain technology that provides a complete solution. This solution also minimizes the attack surface while maximizing availability, addressing the data at rest problem cited earlier.

A blockchain implementation is a specialized database consisting of an ordered sequence of blocks, each block containing a group of transactions. A blockchain forms an indelible record of transactions via a trustless distributed consensus model. Each full node on the blockchain network constructs its own blockchain from first principles, validating every block and validating every transaction using only its own trusted blockchain. Consensus is established by a majority of full nodes, mitigating the vulnerability of compromised nodes. Adding full nodes reduces the attack surface while increasing availability. Implementing a record of provenance using blockchain technology meets all of the requirements for establishing authenticity and provenance of physical assets.

Every transaction in a blockchain is protected by one or more digital signatures using public-key cryptography (PKC). A form of asymmetric cryptography, PKC employs key pairs: a private key (described earlier as a robust secret identity) and a public key (described earlier as a robust public identity).

A digital signature algorithm (DSA) processes an input message (which may be thought of as a challenge) and a private key, and produces a digital signature (which may be thought of as a response). Validation of a digital signature is a function of the input message and the public key.

DSA provides authentication without the risks of a shared key. Additionally, DSA protects the integrity of the input message, preventing modification of the input message. Furthermore, DSA provides non-repudiation: any entity can independently validate the digital signature.

In a blockchain, DSA processes a transaction—formally, a cryptographic hash function of a transaction producing a transaction hash—as the input message and stores the result in the transaction. The digital signature protects the integrity of the transaction by preventing modification due to malfeasance or malfunction. More prominently, the digital signature proves ownership and approval of the asset transfer described in the transaction: the existing owner generates the digital signature using a private key associated with the asset.

This blockchain implementation employs two digital signatures in every transaction, known as 2-of-2 MultiSig. One of the digital signatures is provided by the existing owner of the physical asset, as described in the preceding paragraph. The second digital signature is provided by the cryptographically strong RFID tag: DSA is the challenge-response mechanism, using one-way mathematical function of the transaction hash and the private key securely ensconced within the RFID tag.

The digital signature provided by the existing owner is cryptographic proof of ownership of the physical asset and approval of a transaction. The digital signature provided by the RFID tag is cryptographic proof that the physical asset is present during the transaction. Both digital signatures are recorded in the transaction and both digital signatures are validated by every full node on the blockchain network.

A new physical asset is added to the blockchain with a registration transaction. This type of transaction can be performed only by a trusted agent known to the blockchain, for example, a manufacturer. Trusted agents hold a trusted agent key pair, including their robust private identity (private key) and a robust public identity (public key). The public key may be registered with a third-party certificate authority.

Registration transactions include the trusted agent public key and the RFID tag public key, binding the physical asset to the trusted agent. A registration transaction includes a digital signature produced by a physical asset's trusted agent and a digital signature produced by its RFID tag. The respective private keys are required to produce these digital signatures, so the digital signatures cannot be forged. Every registration transaction is validated by all full nodes on the blockchain network. After being mined and recorded in the blockchain, a registration transaction is cryptographic proof of authenticity.

Ownership of a physical asset is transferred with a conveyance transaction. This type of transaction can be performed by anyone possessing the physical asset: a distributor, retailer, individual seller, subcontractor, testing service, calibration service, or other supply-chain partner. A conveyance transaction includes a digital signature produced by a physical asset's existing owner and a digital signature produced by its RFID tag. Every conveyance transaction is validated by all full nodes on the blockchain network. After being mined and recorded in the blockchain, a conveyance transaction is cryptographic proof of the physical asset's provenance.

A physical asset's first conveyance transaction is linked to its registration transaction. Each subsequent conveyance transaction is linked to the physical asset's previous conveyance transaction. Every full node maintains an index of the latest transaction for each physical asset. The complete provenance of a physical asset is explored by "walking back" through its linked transactions to its registration transaction.

The authenticity and provenance of a physical asset may be explored and vetted by any entity. The digital signature algorithm incorporated into the cryptographically strong RFID tag provides authentication with non-repudiation (challenge-response mechanisms using symmetric cryptography provide only authentication). Non-repudiation enables any entity to validate independently the RFID tag challenge-response mechanism, including remote entities without direct access to the physical asset. Furthermore, non-repudiation is enables any entity to investigate a physical asset's entire record in the blockchain, by independently validating each transaction.

Tackling anti-counterfeiting and supply chain assurance delivers great value to manufacturers and customers in the primary market. Significant additional value is delivered aftermarket. Industrial, medical, aerospace, and military equipment may be tracked across departments and organizations; maintenance tests and calibrations may also be recorded. Luxury goods secondary sales are conducted with complete confidence, benefitting all parties: the buyer, the seller, and the manufacturer (brand protection). Every one of these primary and secondary transactions is conducted and recorded with the protection of strong contemporary cryptography.

The novel implementation of blockchain technology employing the cryptographically strong RFID tag constructs an indelible and cryptographically provable record of authenticity and provenance. The registration and conveyance transactions record not simply a reference to a physical asset, but instead record the active participation of a physical asset in its transactions. Every transaction involving a specific physical asset includes a digital signature that can only be produced by its attached RFID tag. Furthermore, such a digital signature can only be produced during the transaction, proving that a physical asset was present during each of its transactions. An entity can independently inspect and validate a physical asset's transactions. Physical assets are thereby protected with a new level of trustworthiness.

BRIEF DESCRIPTION OF THE DRAWINGS

FIG. 8 is a flow diagram of an embodiment of a process in which an existing owner (entity A) holding a physical asset uses his RFID-blockchain interface (A's RBI) to create a conveyance transaction data structure and submit a conveyance transaction to a blockchain network; this may be known as a "conveyance of physical asset from entity A to entity B" process.

FIG. 9, an overview diagram of an embodiment of a blockchain of physical asset transactions, using illustrative data.

FIG. 10 is a flow diagram of an embodiment of a process in which an entity confirms the authenticity and provenance of a physical asset without creating a new transaction, which may be called an "investigate physical asset" process.

DETAILED DESCRIPTION

Figure 1:
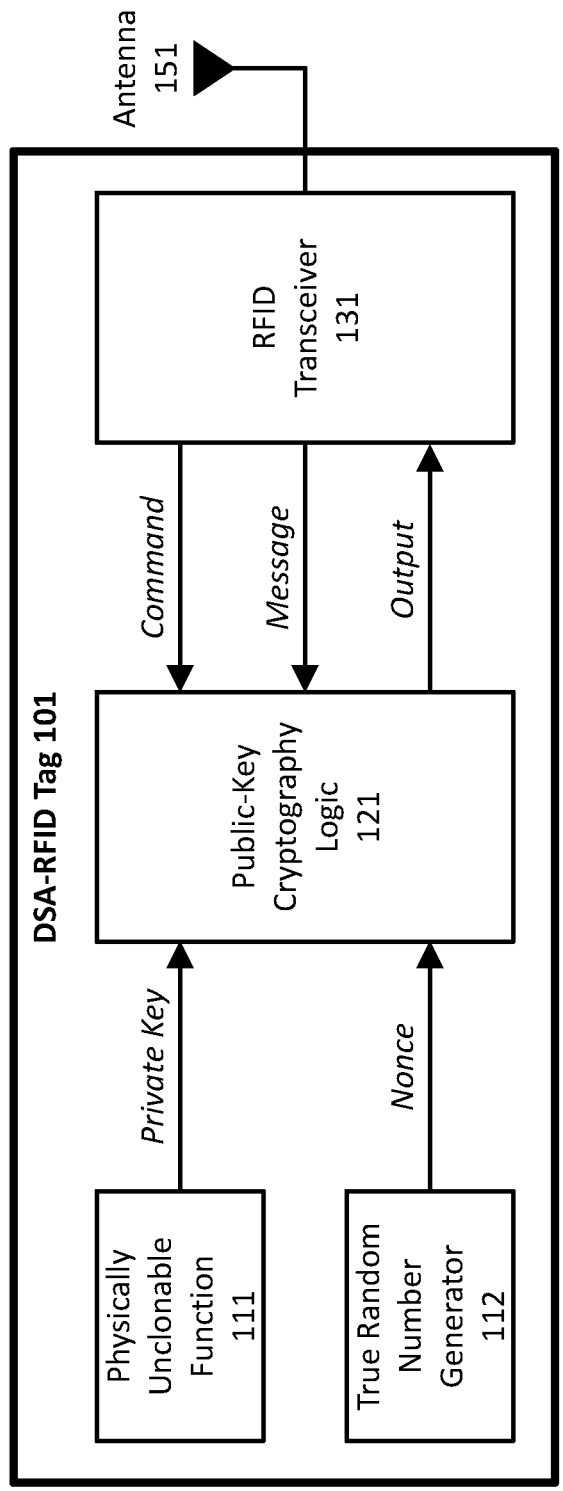
FIG. 1 is a schematic diagram of an embodiment of a digital signature algorithm (DSA) radio frequency identification (RFID) tag including, public-key cryptography (PKC) logic and a physically unclonable function (PUF).

FIG. 1 shows a schematic diagram of an embodiment of a digital signature algorithm (DSA) radio frequency identification (RFID) tag 101 including, public-key cryptography (PKC) logic 121 and a physically unclonable function (PUF) 111. A true random number generator 112 supplies cryptographic nonce values to PKC logic 121. An RFID transceiver 131 receives inputs to and transmits outputs from PKC logic 121 via antenna 151. The DSA-RFID tag 101 receives a command and message data from an external interface device, performs PKC operations, and transmits the result to the external interface device in response to the command.

In one embodiment, the DSA-RFID tag 101 is attached to a physical asset, for example: industrial equipment, medical equipment, an aerospace system, a military system, a subsystem, a subassembly, luggage, handbags, wallets, shoes, works of art.

In one embodiment, the DSA-RFID tag 101 includes anti-tamper measures that render the DSA-RFID tag permanently inoperable should it be removed from the physical asset.

In one embodiment, the DSA-RFID tag 101 is implemented as an integrated circuit (IC).

In one embodiment, the DSA-RFID tag 101 implemented as an IC is joined to a substrate containing antenna 151.

In one embodiment, the DSA-RFID tag 101 implemented as an IC is joined to a package containing antenna 151.

Physically unclonable function (PUF) 111 produces a unique, unobservable, unclonable, and permanent output value used as the private key by PKC logic 121. PUFs exploit variations inherent in the manufacture of semiconductor ICs to produce a statistically random output value that is different in every IC manufactured, including ICs manufactured on the same semiconductor wafer. The output of PUF 111 cannot be observed by an attacker attempting to copy private key values, thereby preventing cloning, reproduction, or emulation of a DSA-RFID tag 101.

PUF 111—with its unique, unobservable, unclonable, and permanent output value serving as the private key value— endows each DSA-RFID tag 101 with a robust secret identity.

PKC logic 121 utilizes highly secure public key cryptography (PKC) implemented, for example, as logic gates, a microsequencer, and/or a set of instructions running on a processor.

In one embodiment, PKC logic 121 utilizes a digital signature algorithm (DSA), as understood by a person of ordinary skill in the art.

In one embodiment, PKC logic 121 utilizes an RSA digital signature algorithm, as understood by a person of ordinary skill in the art.

In one embodiment, PKC logic 121 utilizes an elliptic curve digital signature algorithm (ECDSA), as understood by a person of ordinary skill in the art.

Public-key cryptography (PKC) employs a private key (secured secret) known only by one entity and a public key (openly shared) known to other entities; PKC assumes that the public key may be known to attackers. PKC utilizes one-way mathematical functions: calculation in the forward direction is straightforward, while calculation in the reverse direction is so difficult as to be considered impossible. The use of public-private key pairs and one-way mathematical functions is also known as asymmetric cryptography.

By way of an illustrative example, consider sending a message from entity A to entity B using PKC. Entity A encrypts a plaintext message using a one-way cipher function and B's public key in a straightforward calculation, producing a ciphertext. The ciphertext is sent from A to B over an open communication channel. Entity B decrypts the ciphertext using B's private key in a straightforward calculation, re-producing the plaintext. An attacker (with B's public key and the ciphertext) attempting to recover the plaintext faces a challenge so difficult as to be considered impossible.

RFID transceiver 121 and antenna 151 receive commands and message data from and transmit signatures to an external interface device via electromagnetic fields.

In one embodiment, the DSA-RFID tag 101 is implemented as a passive RFID tag, receiving its power from an external interface device, as understood by a person of ordinary skill in the art.

In one embodiment, the DSA-RFID tag 101 is implemented as an HF RFID tag, as understood by a person of ordinary skill in the art.

In one embodiment, the DSA-RFID tag 101 is implemented as an UHF RFID tag, as understood by a person of ordinary skill in the art.

Figure 2:
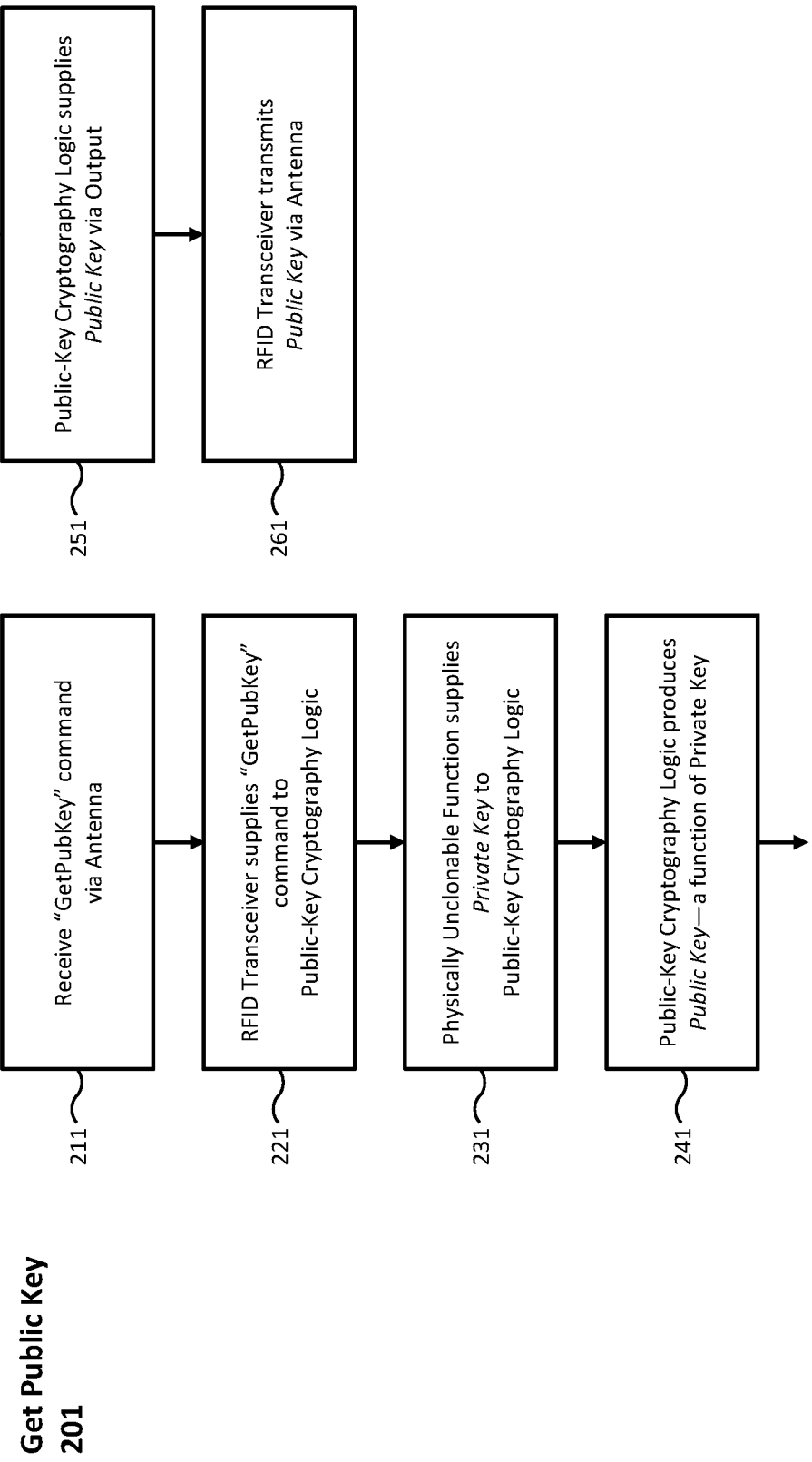
FIG. 2 is a flow diagram of an embodiment of a process to retrieve a public key from a DSA-RFID tag; this may be known as a "get public key" process.

Referring additionally to FIG. 2, a flow diagram of an embodiment of a process to retrieve a public key from a DSA-RFID tag 101 is shown; this may be known as a "get public key" process 201. An external interface device (examples of which are described below) sends a GetPubKey command, received 211 via antenna 151. RFID transceiver 131 demodulates the analog radio frequency signal and produces 221 a digital command output to public-key cryptography (PKC) logic 121. Physically unclonable function (PUF) 111 supplies 231 the private key value to PKC logic 121.

PKC logic 121 calculates 241 the public key value—a function of private key value—using a one-way mathematical function. This calculation is straightforward in this forward direction (producing the public key), while calculation in the reverse direction (re-constructing the private key) is so difficult as to be considered impossible.

In one embodiment, during a DSA-RFID tag's first "get public key" process 201, PKC logic 121 stores the public key value in its non-volatile memory (NVM). Any subsequent "get public key" process 201 accesses the public key value from NVM.

PKC logic 121 supplies 251 the public key value to the RFID transceiver 131. RFID transceiver 131 modulates the digital public key value onto the analog radio frequency signal, transmitted 261 via antenna 151.

In one aspect, the public key value is utilized in PKC calculations. In another aspect, the public key value uniquely identifies the DSA-RFID tag 101. For embodiments in which the DSA-RFID tag 101 is attached to a physical asset, the public key value endows each physical asset with a robust public identity.

Figure 3:
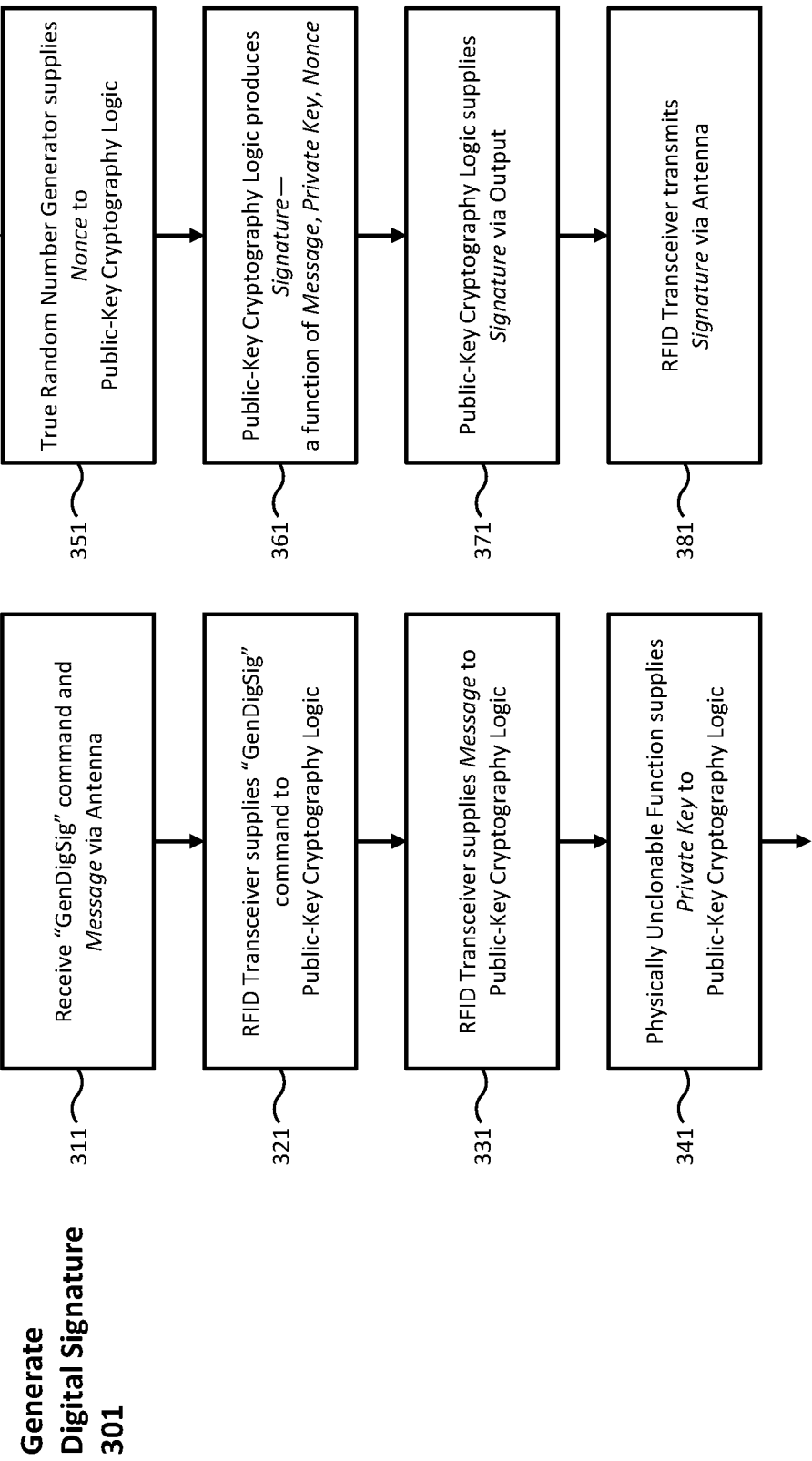
FIG. 3 is a flow diagram of an embodiment of a process in which a DSA-RFID tag generates a digital signature in response to a command from an external interface; this may be known as a "generate digital signature" process.

Referring additionally to FIG. 3, a flow diagram of an embodiment of a process in which a DSA-RFID tag 101 generates a digital signature in response to a command from an external interface is shown; this may be known as a "generate digital signature" process 301. An external interface device sends a GetPubKey command and message data, received 311 via antenna 151. RFID transceiver 131 demodulates the analog radio frequency signal and produces 321 a digital command output to public-key cryptography (PKC) logic 121. RFID transceiver 131 demodulates the analog radio frequency signal and produces 331 a message data output to PKC logic 121. Physically unclonable function (PUF) 111 supplies 341 the private key value to PKC logic 121. True random number generator 112 supplies 351 a nonce value to PKC logic 121.

In one embodiment, message data is fixed in length. A cryptographic hash function performed on a variable-length message by an external device produces a fixed-length hash digest that uniquely represents the message. A cryptographic hash is a one-way mathematical function: calculation in the forward direction is straightforward, while calculation in the reverse direction is so difficult as to be considered impossible. A cryptographic hash function produces a hash digest that serves as a robust identifier of the variable-length message and completely obfuscates the variable-length message, as understood by a person of ordinary skill in the art.

In one embodiment, PKC logic 121 performs a cryptographic hash function that processes a variable-length message to produce a fixed-length hash digest.

In one embodiment, an external interface device performs a cryptographic hash function that processes a variable-length message to produce a fixed length message.

PKC logic 121 calculates 361 the digital signature value—a function of message data, private key value, and nonce value—using a digital signature algorithm. This calculation is straightforward in this forward direction (producing the digital signature), while calculation in the reverse direction (re-constructing the private key) is so difficult as to be considered impossible. Without the private key value, an attacker attempting to forge a digital signature faces a challenge so difficult as to be considered impossible.

PKC logic 121 supplies 371 the digital signature value to the RFID transceiver 131. RFID transceiver 131 modulates the digital signature value onto the analog radio frequency signal, transmitted 381 via antenna 151.

For embodiments in which the DSA-RFID tag 101 is attached to a physical asset, the public key value endows a physical asset with a robust public identity. In one aspect, the digital signature is cryptographic proof that the message was digitally signed by the robust secret identity corresponding to the robust public identity. Because the robust secret identity—in the form of the private key—exists only in the DSA-RFID tag 101 and never exists outside the DSA-RFID tag, the digital signature is cryptographic proof that the physical asset directly participated in the "generate digital signature" process 301. In another aspect, the digital signature is cryptographic proof of message integrity, preventing modification of the message data by malfeasance or malfunction.

In one embodiment, the public key value (produced by a "get public key" process 201) and the digital signature value (produced by a "generate digital signature" process 301) are recorded in a blockchain. A blockchain is a database providing a trustworthy and indelible record of transactions, as understood by a person of ordinary skill in the art. Having endowed a physical asset with a robust public identity and the ability to generate digital signatures with its robust secret identity, a physical asset participates directly in the creation of blockchain transactions documenting its authenticity and provenance. Such blockchain transactions represent a trustworthy and indelible record of a physical asset itself.

Figure 4:
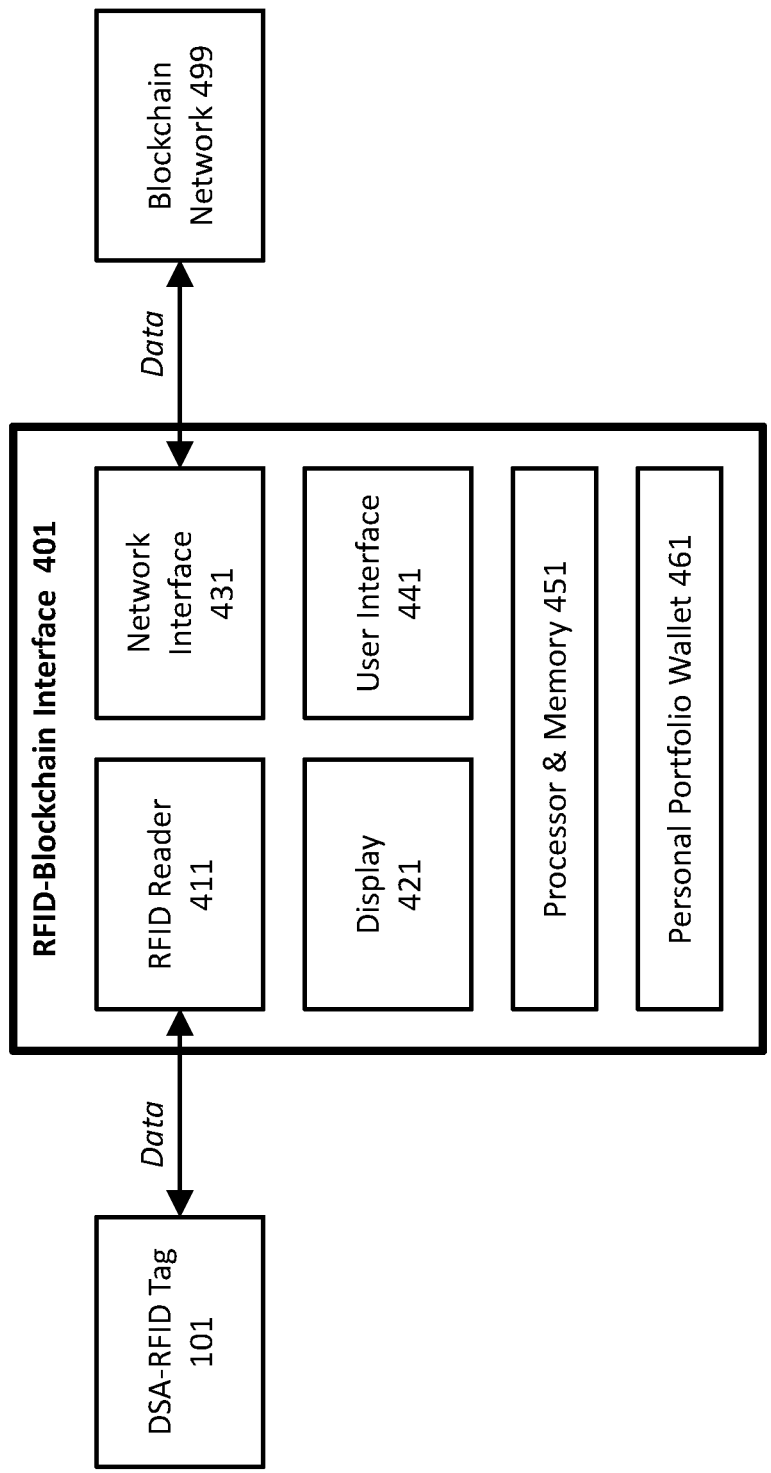
FIG. 4 is a schematic diagram of an embodiment of an RFID-blockchain interface (RBI).

FIG. 4 shows a schematic diagram of an embodiment of an RFID-blockchain interface (RBI) 401.

In one embodiment, the RBI 401 is a dedicated hardware device, i.e. a device that primarily provides the functions described below.

In one embodiment, the RBI 401 is a software application running on a mobile phone or other mobile computing device.

In one embodiment, the RBI 401 is a software application running on a laptop computer or other personal computing device.

In one embodiment, the RBI 401 incorporates an RFID reader 411 that includes an RFID transceiver and antenna to communicate with a DSA-RFID tag 101. During operation, the RBI 401 and DSA-RFID tag 101 are in close proximity, as understood by a person of ordinary skill in the art.

In one embodiment, the RFID reader is external to the RBI 401. In this embodiment, the RFID reader is coupled to the RBI 401 via a wireless or wired communication channel. During operation, the external RFID reader and DSA-RFID tag 101 are in close proximity, as understood by a person of ordinary skill in the art.

The RBI 401 includes a network interface 431 the can communicate with a blockchain network 499.

In one embodiment, network interface 431 communicates via a wireless communication channel, as understood by a person of ordinary skill in the art.

In one embodiment, the network interface 431 communicates via a wired communication channel, as understood by a person of ordinary skill in the art.

For embodiments in which the RBI 401 is a dedicated hardware device, the RBI includes a display 421 to provide information to an entity, a user interface 441 to receive input from an entity, and a processor and memory 451. The processor and memory may be used to perform public-key cryptography (PKC) logic.

For embodiments in which the RBI 401 is a software application running on a host device, the RBI utilizes the display, user interface, processor, and memory of the host device. The processor and memory of the host device may be used to perform PKC logic.

The RBI 401 includes a personal portfolio wallet (PPW) 461, a database of credentials for each physical asset owned by an entity. A physical asset's credentials include its robust public identity (public key) produced by its DSA-RFID tag 101 and an ethereal key pair (private key and public key) produced by the RBI 401.

To produce an ethereal key pair, the RBI 401 performs a "get public key" process 201 with a physical asset having an attached DSA-RFID tag 101 and stores the public key value with the physical asset's credentials in the PPW 461. In one aspect, the public key value is used as physical asset's robust public identity. In another aspect, the public key value identifies the physical asset's credentials in the PPW 461, including the physical asset's ethereal key pair. The RBI 401 generates a random number and stores the result as an ethereal private key in in the physical asset's credentials. The RBI 401 calculates the corresponding ethereal public key value—a function of the ethereal private key value—using a one-way mathematical function and stores the result in the physical asset's credentials.

In one embodiment, the PPW 461 is encrypted with a password provided by an entity via the user interface. This password must again be provided before the RBI 401 can decrypt and utilize the PPW 461.

Figure 5:
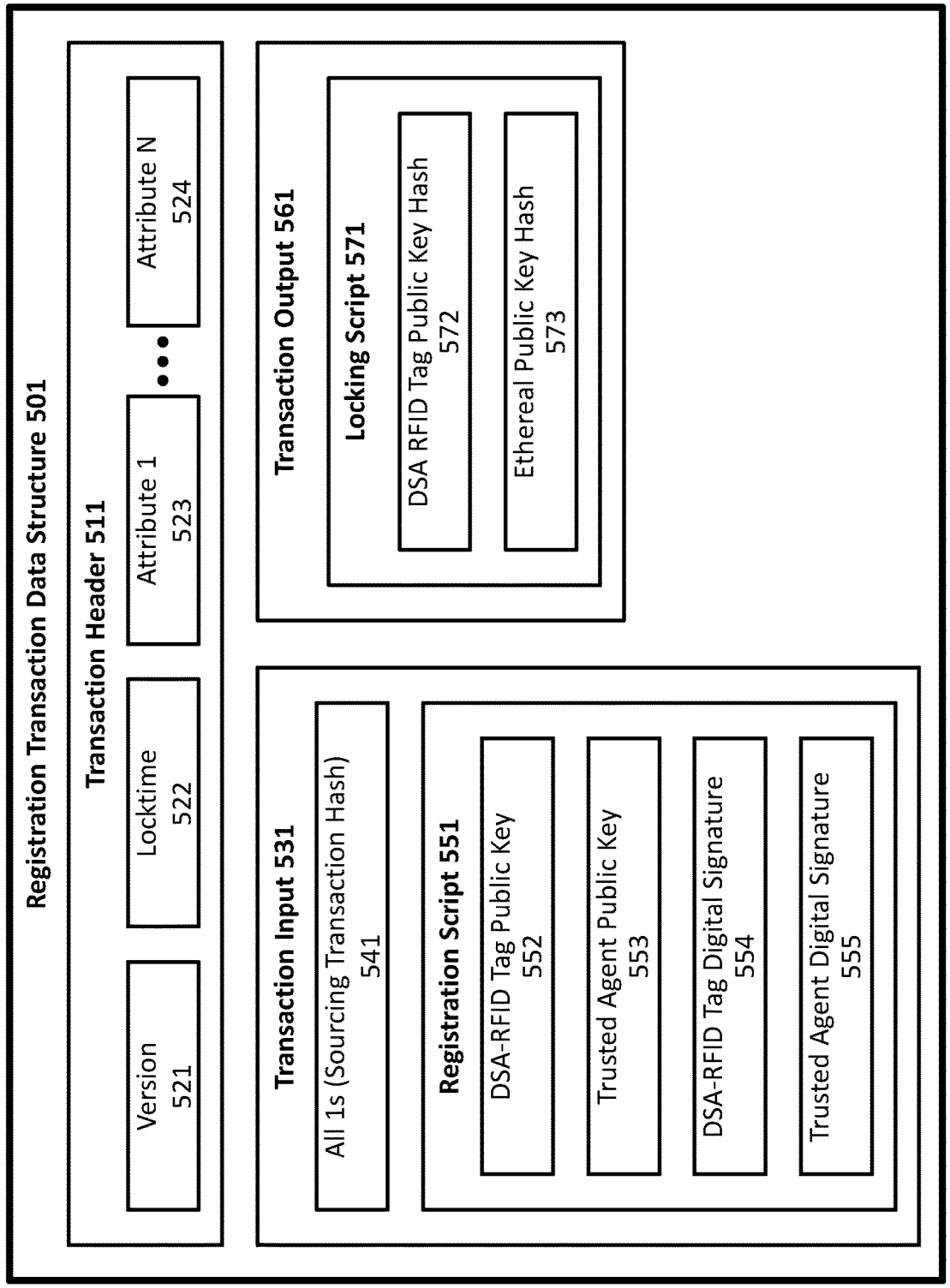
FIG. 5 is a diagram of an embodiment of a registration transaction data structure, including a transaction header, transaction input, and transaction output.

FIG. 5 shows a diagram of an embodiment of a registration transaction data structure 501, including a transaction header 511, transaction input 531, and transaction output 561. A registration transaction data structure 501 is used the first time a physical asset is recorded in a blockchain to document the binding between a physical asset and a trusted agent.

A trusted agent is a certified entity granted the capability to record new (previously unrecorded) physical assets in a blockchain, by creating registration transaction data structures and submitting them as a registration transaction to the blockchain network.

In one embodiment, a trusted agent is a manufacturer of physical assets, including, for example an artist or a company.

In one embodiment, a trusted agent is a respected expert in authenticating physical assets.

A trusted agent key pair includes a private key produced by a random number generator and a public key calculated by a one-way mathematical function of the private key. A trusted agent key pair provides a robust private identity (trusted agent private key) and a robust public identity (trusted agent public key).

In one embodiment, the trusted agent public key 553 is recorded with a third-party certificate authority, as understood by a person of ordinary skill in the art.

A transaction header includes a version field 521 that identifies the protocol specification of the registration transaction data structure 501 and identifies the transaction type as a registration transaction.

A transaction header 511 includes a locktime field 522 that specifies the earliest time that the blockchain network will add the registration transaction to its blockchain, as understood by a person of ordinary skill in the art.

A transaction header 511 includes any number of attribute fields 523 thru 524 that provide information about the physical asset. This information may include description of the trusted agent, description of manufacturing, description of the physical asset, and other descriptions or declarations.

In one embodiment, attribute field(s) 523 thru 524 may contain a hash digest produced by a cryptographic hash function of a full description. A hash digest completely obfuscates a potentially sensitive description, such as the name of a craftsman involved in manufacturing. The full description is supplied in a separate action using an out-of-band communication channel; a cryptographic hash function of this full description is compared to the hash digest recorded as an attribute in the transaction; if the two values match, the hash digest recorded in the transaction represents the full description.

A transaction input 531 includes a sourcing transaction hash field 541 filled, for example, with all 1s (binary) to signify that the new physical asset is not represented in any previous transactions recorded in the blockchain.

A transaction input 531 includes a registration script 551 that provides cryptographic proof of the binding between a physical asset and a trusted agent. A registration script 551 includes a DSA-RFID tag public key field 552 that contains the physical asset's robust public identity. A registration script 551 includes a trusted agent public key field 553 that contains the trusted agent's robust public identity.

A registration script 551 includes a DSA-RFID tag digital signature field 554—a function of the DSA-RFID tag's 101 robust private identity and the contents of the registration transaction data structure 501. A registration script 551 includes a trusted agent digital signature field 555—a function of the trusted agent's robust private identity and the contents of the registration transaction data structure 501.

A transaction output 561 includes the encumbrances to be satisfied in order for the blockchain network to accept a future conveyance transaction of the physical asset. This encumbrance may be expressed as a locking script 571 that includes information required by the blockchain network to validate a future conveyance transaction of the physical asset.

A locking script 571 includes a DSA-RFID public key hash field 572—a function of DSA-RFID public key 552. A locking script 571 includes an ethereal public key hash field 573—a function of the physical asset's ethereal public key (from the physical asset's credentials in the trusted agent's PPW).

Figure 6:
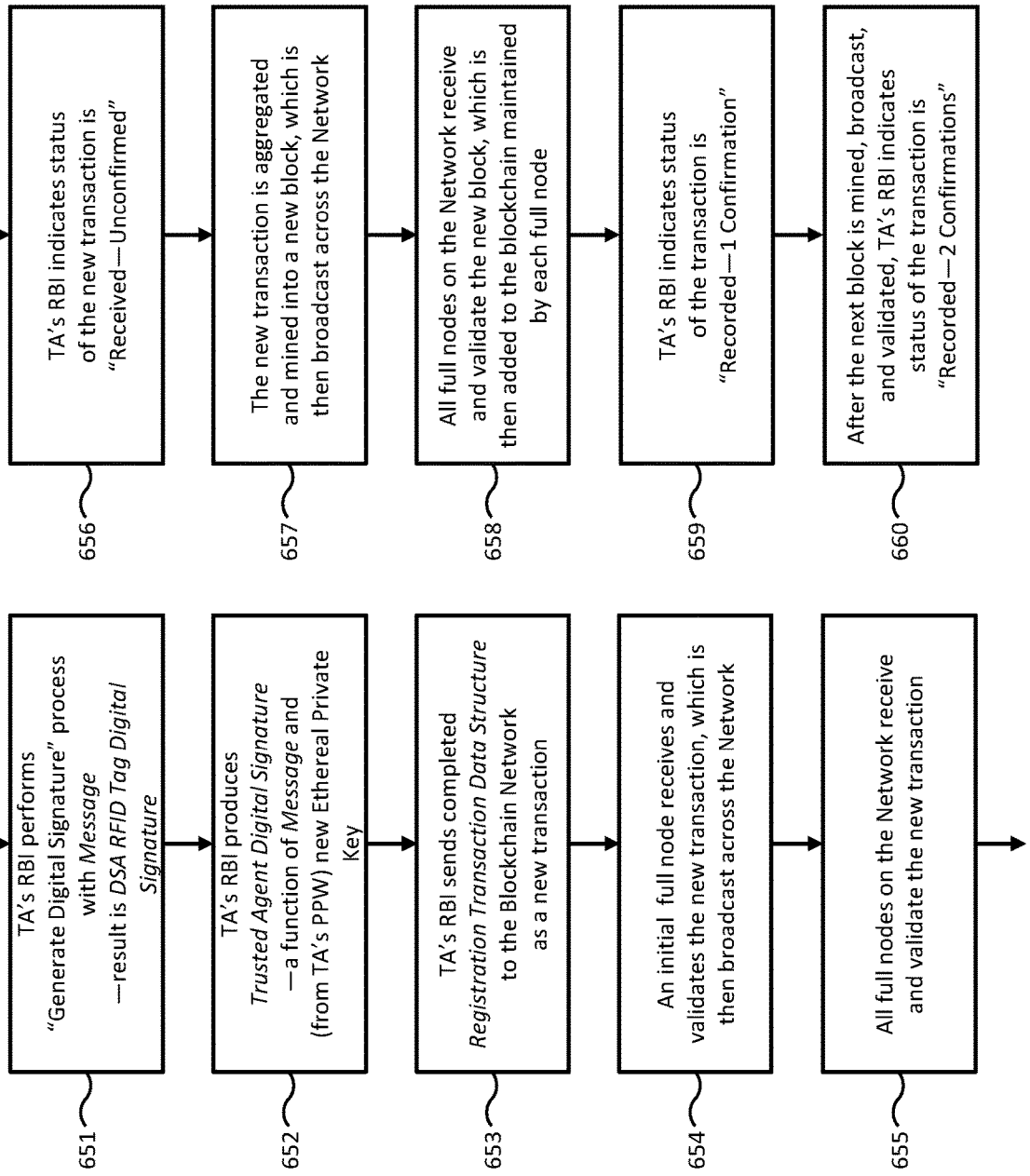
FIG. 6 is a flow diagram of an embodiment of a process in which a trusted agent holding a physical asset uses her RFID-blockchain interface (TA's RBI) to create a registration transaction data structure and submit a registration transaction to a blockchain network; this may be known as a "registration of physical asset by trusted agent" process.

Referring additionally to FIG. 6, a flow diagram of an embodiment of a process in which a trusted agent holding a physical asset uses her RFID-blockchain interface (TA's RBI) 401 to create a registration transaction data structure 501 and submit a registration transaction to a blockchain network is shown; this may be known as a "registration of physical asset by trusted agent" process 601. This process binds a physical asset to a trusted agent, establishing authenticity.

A trusted agent selects 611 "Registration" on the user interface of TA's RBI. TA's RBI creates 612 a new registration transaction data structure 501 in local memory, initializes all fields to, for example, all 0s (binary), and then sets the sourcing transaction hash 541 to all 1s (binary). In the transaction header: TA's RBI completes 613 the version 521; the trusted agent completes 613 the locktime 522 and any attributes 523 thru 524 via the user interface.

TA's RBI performs 614 a "get public key" process 201 with the physical asset. The result of the process completes 614 the DSA-RFID public key 552—the robust public identity of the physical asset. TA's RBI completes 615 the trusted agent public key 553—the robust public identity of the trusted agent.

TA's RBI sends 616 the DSA-RFID public key 552 to the blockchain network and requests the most recent transaction of the physical asset. If the blockchain network returns NULL, the physical asset is not represented in any previous transaction in the blockchain and the process continues 617. If the blockchain network returns a transaction, the physical asset is known to the blockchain: the RBI displays 617 "Physical Asset Already Registered" and the process terminates.

TA's RBI creates 618 a set credentials for the pending physical asset—including a new ethereal private key and new ethereal public key—and stores the new credentials in the trusted agent's personal portfolio wallet (PPW). Both the DSA-RFID key pair and the new ethereal key pair are linked to the physical asset: the DSA-RFID private key represents the robust private identity of the physical asset and the new ethereal private key—because it exists only in the trusted agent's PPW—will represent ownership of the physical asset, once the registration transaction is recorded in the blockchain.

TA's RBI performs 619 a cryptographic hash function of the new ethereal public key; the hash digest result completes the ethereal public key hash 573. Recording this hash digest completely obfuscates the value of the underlying public key to provide an additional measure of security: the new ethereal public key remains secret (in the TA's PPW) until it is used in a future conveyance transaction. TA's RBI performs a cryptographic hash function of the DSA-RFID public key 552; the hash digest result completes 619 the DSA-RFID public key hash 572.

The registration transaction data structure 501 is complete, except for the two digital signatures 554 and 555 that remain filled with all 0s (binary). TA's RBI performs 620 a cryptographic hash function of the registration transaction data structure 501; the hash digest result is saved in local memory as a message.

TA's RBI performs 651 a "generate digital signature" process 301 with the message (the hash digest saved in local memory); the result of the process completes 651 the DSA-RFID digital signature 554. TA's RBI completes 652 trusted agent digital signature 555—a function of the message (the hash digest saved in local memory) and the trusted agent private key.

TA's RBI sends 653 the completed registration transaction data structure 501 to the blockchain network as a new registration transaction.

An initial full node on the blockchain network receives and validates 654 the new transaction. The initial full node validates both digital signatures: it makes a temporary copy of the new transaction, fills both digital signature fields with all 0s (binary), and performs a cryptographic hash function of the new transaction temporary copy to produce a hash digest; it validates the DSA-RFID digital signature using the DSA-RFID public key and the hash digest; it validates the trusted advisor digital signature using the trusted advisor public key and the hash digest.

For embodiments in which the DSA-RFID tag 101 is attached to a physical asset, a valid DSA-RFID digital signature is cryptographic proof that the physical asset was present during its registration. A valid trusted agent digital signature is cryptographic proof that the trusted agent registered the physical asset. Together, both valid digital signatures in a registration transaction are cryptographic proof of authenticity.

For embodiments in which the trusted agent public key is recorded with a third-party certificate authority, the initial full node validates that the trusted advisor public key value in the new transaction matches the trusted advisor public key value provided by the third-party certificate authority.

Upon validating both digital signatures, the initial full node broadcasts 654 the registration transaction across the blockchain network. All full nodes receive and validate 655 the new transaction.

TA's RBI sends ethereal public key hash 573 to the blockchain network and requests the status of the corresponding transaction. The blockchain network provides the hash digest of the new registration transaction; this registration transaction hash uniquely identifies the transaction and is stored with the physical asset's credentials in the trusted agent's PPW: the DSA-RFID tag public key 552, the new ethereal key pair, the new ethereal public key hash 573, and the registration transaction hash.

TA's RBI indicates 656 that the status of the registration transaction is "Received—Unconfirmed," reflecting that the new transaction has been received and validated by the blockchain network though not yet mined into a block and recorded in the blockchain.

The registration transaction is aggregated and mined 657 with other new transactions—from the same RBI and/or other RBIs—into a new block, as understood by a person of ordinary skill in the art. The new block is broadcast 657 across the blockchain network.

All full nodes receive and validate 658 the new block, which is then added to the blockchain maintained by each full node, as understood by a person of ordinary skill in the art.

TA's RBI indicates 659 that the status of the registration transaction is "Recorded—1 Confirmation," reflecting that the transaction has been recorded in the blockchain.

The next block is mined, broadcast, and validated. TA's RBI indicates 660 that the status of the registration transaction is "Recorded—2 Confirmations," reflecting that the transaction is effectively an indelible record in the blockchain.

Figure 7:
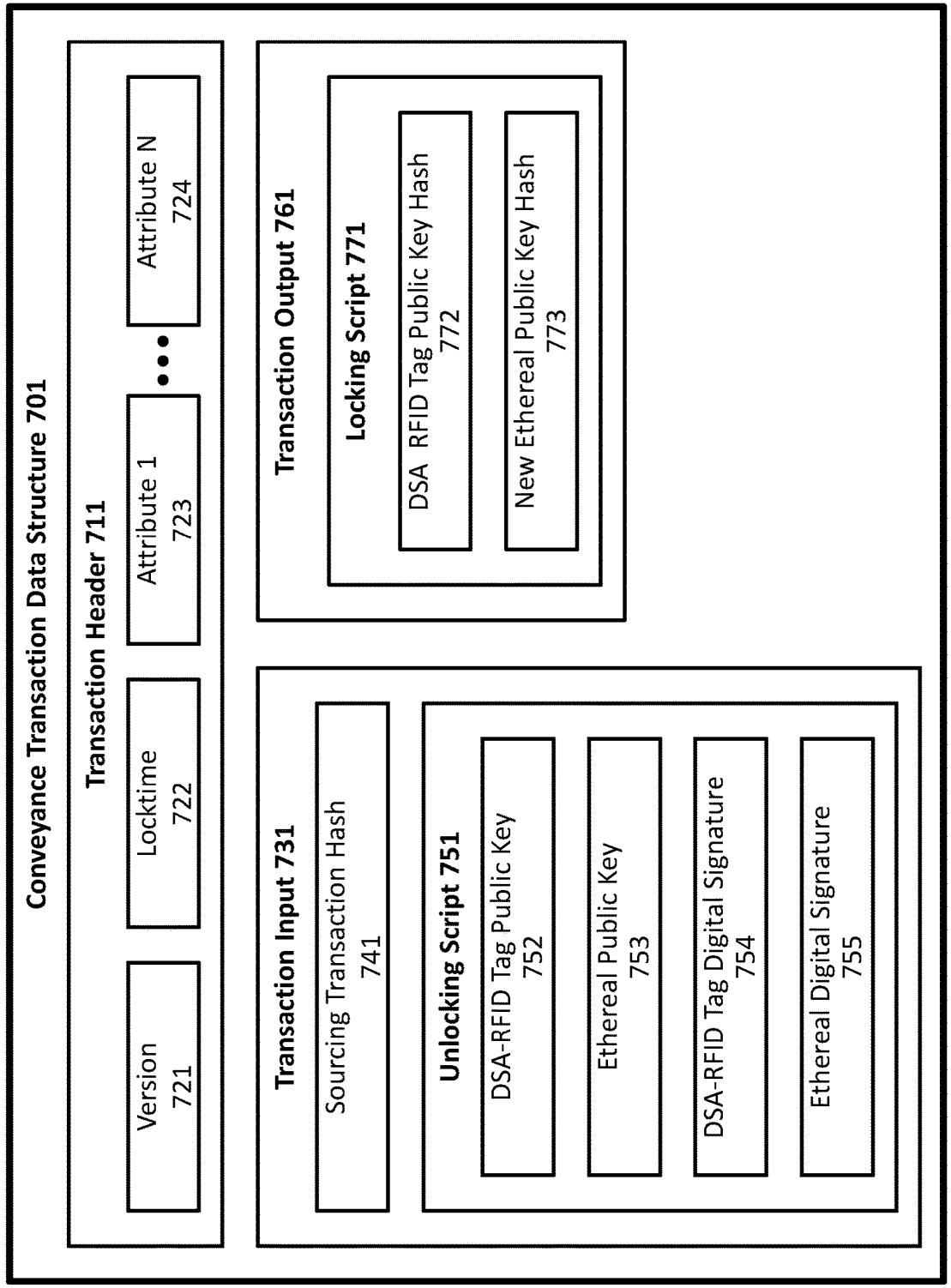
FIG. 7 is a diagram of an embodiment of a conveyance data structure, including a transaction header, transaction input, and transaction output.

FIG. 7 shows a diagram of an embodiment of a conveyance transaction data structure 701, including a transaction header 711, transaction input 731, and transaction output 761. An entity that owns a physical asset (already recorded in the blockchain) may record a transfer of ownership by creating a conveyance transaction data structure 701 and submitting it as a conveyance transaction to the blockchain network.

A transaction header 711 includes a version field 721 that identifies the protocol specification of the conveyance transaction data structure and identifies the transaction type as a conveyance transaction.

A transaction header 711 includes a locktime field 722 that specifies the earliest time that the blockchain network will add the conveyance transaction to its blockchain, as understood by a person of ordinary skill in the art.

A transaction header 711 includes any number of attribute fields 723 thru 724 that provide information about the physical asset. For example, this information may include description of the existing owner, description of the new owner, description of the physical asset, and other descriptions or declarations.

In one embodiment, attribute field(s) 723 thru 724 may contain a hash digest produced by a cryptographic hash function of a full description. A hash digest completely obfuscates a potentially sensitive description, such as a name of the new owner. The full description is supplied in a separate action using an out-of-band communication channel; a cryptographic hash function of this full description is compared to the hash digest recorded as an attribute in the transaction; if the two values match, the hash digest recorded in the transaction represents the full description.

A transaction input 731 includes a sourcing transaction hash field 741 that identifies the most recent transaction of the physical asset. A transaction input 731 includes an unlocking script 751. The unlocking script 751 includes information required by the blockchain network to satisfy the encumbrance expressed as the locking script in the sourcing transaction.

An unlocking script 751 includes a DSA-RFID tag public key field 752 and an ethereal public key field 753 (from the physical asset's credentials in the existing owner's PPW). These values are used by full nodes to validate the digital signatures in the unlocking script.

An unlocking script 751 includes a DSA-RFID tag digital signature field 754—a function of the DSA-RFID private key and the contents of the conveyance transaction data structure 701. An unlocking script 751 includes an ethereal digital signature field 755—a function of the existing ethereal private key (from the physical asset's credentials in the existing owner's PPW) and the contents of the conveyance transaction data structure 701.

A transaction output 761 includes the encumbrances to be satisfied in order for the blockchain network to accept a future conveyance transaction of the physical asset. This encumbrance may be expressed as a locking script 771 that includes information required by the blockchain network to validate a future conveyance transaction of the physical asset.

A locking script 771 includes a DSA-RFID public key hash field 772—a function of DSA-RFID public key 752. A locking script 771 includes a new ethereal public key hash field 773—a function of the physical asset's new ethereal public key (from the physical asset's credentials in the new owner's PPW).

Referring additionally to FIG. 8, a flow diagram of an embodiment of a process in which an existing owner (entity A) holding a physical asset uses his RFID-blockchain interface (A's RBI) to create a conveyance transaction data structure 701 and submit a conveyance transaction to a blockchain network is shown; this may be known as a "conveyance of physical asset from entity A to entity B" process 801. This process transfers ownership of a physical asset from entity A to entity B, establishing provenance.

Entity A selects 811 "Conveyance" on the user interface of A's RBI. A's RBI creates 812 a new conveyance transaction data structure 701 in local memory and initializes all fields to, for example, all 0s (binary). In the transaction header: A's RBI completes 813 the version 721; entities A and B complete 813 the locktime 722 and any attributes 723 thru 724 via the user interface.

A's RBI performs 814 a "get public key" process 201 with the physical asset. The result of the process completes 814 the DSA-RFID public key 752—the robust public identity of the physical asset. The DSA-RFID public key 752 identifies the physical asset in A's PPW, a record of elements including: the existing ethereal key pair, the existing ethereal public key hash, and the hash digest of the sourcing transaction.

The physical asset's credentials in A's PPW supplies 816 the hash digest of the sourcing transaction to complete the sourcing transaction hash 741. The physical asset's credentials in A's PPW supplies 816 the existing ethereal public key to complete the ethereal public key 753.

Entity B selects 817 "Receive Asset" on the user interface of B's RBI. B's RBI creates 817 a set credentials for the pending physical asset—including a new ethereal private key and new ethereal public key—and stores the new credentials in B's RBI's personal portfolio wallet (PPW).

B's RBI performs 818 a cryptographic hash function of the new ethereal public key; the hash digest result is the new ethereal public key hash. B's RBI sends the new ethereal public key hash to A's RBI.

In one embodiment, B's RBI encodes the new ethereal public key hash as a visual matrix barcode and displays the result. In this embodiment, A's RBI receives the visual matrix barcode via a camera or similar image capture device.

In one embodiment, a remote entity B sends the new ethereal public key hash to entity A over an open channel (such as email or instant messenger).

A's RBI receives 819 the new ethereal public key hash 773. Recording this hash digest completely obfuscates the value of the underlying public key to provide an additional measure of security: the new ethereal public key remains secret (in the B's PPW) until it is used in a future conveyance transaction. A's RBI performs a cryptographic hash function of the DSA-RFID public key 752; the hash digest result completes 819 the DSA-RFID public key hash field 772.

The conveyance transaction data structure 701 is complete, except for the two digital signatures 754 and 755 that remain filled with all 0s (binary). A's RBI performs 820 a cryptographic hash function of the conveyance transaction data structure; the hash digest result is saved in local memory as message.

A's RBI performs 851 a "generate digital signature" process 301 with the message (the hash digest saved in local memory); the result of the process completes 851 the DSA-RFID digital signature field 754. A's RBI completes 852 the ethereal digital signature field 755—a function of the message (the hash digest saved in local memory) and the existing ethereal private key (from the physical asset's credentials in A's PPW).

A's RBI sends 853 the completed conveyance transaction data structure 701 to the blockchain network as a new conveyance transaction.

An initial full node on the blockchain network receives and validates 854 the new transaction. The initial full node validates both public keys in the unlocking script: it performs a cryptographic hash function of the DSA-RFID public key 752 and validates the result hash digest matches the DSA-RFID public key hash field in the sourcing transaction; it performs a cryptographic hash function of the ethereal public key field 753 and validates that the result hash digest matches the ethereal public key hash field in the sourcing transaction. The initial full node validates both digital signatures in the unlocking script: it makes a temporary copy of the new transaction, fills both digital signature fields with all 0s (binary), and performs a cryptographic hash function of the new transaction temporary copy to produce a hash digest; it validates the DSA-RFID digital signature using the DSA-RFID public key and the hash digest; it validates the ethereal digital signature using the ethereal public key and the hash digest.

For embodiments in which the DSA-RFID tag is attached to a physical asset, a valid DSA-RFID digital signature is cryptographic proof that the physical asset was present during its conveyance. A valid ethereal digital signature is cryptographic proof that the owner of record conveyed the physical asset. Together, both valid digital signatures in a conveyance transaction are cryptographic proof of provenance.

Upon validating both digital signatures, the initial full node broadcasts 854 the conveyance transaction across the blockchain network. All full nodes receive and validate 855 the new transaction.

A's RBI and B's RBI send the new ethereal public key hash 773 to the blockchain network and request the status of the corresponding transaction. The blockchain network provides the hash digest of the new conveyance transaction. This hash digest uniquely identifies the transaction and is stored with the physical asset's credentials in B's PPW: the DSA-RFID tag public key 752, the new ethereal key pair, the new ethereal public key hash 773, and the registration transaction hash.

A's RBI and B's RBI indicate 856 that the status of the conveyance transaction is "Received—Unconfirmed," reflecting that the new transaction has been received and validated by the blockchain network though not yet mined into a block and recorded in the blockchain.

The conveyance transaction is aggregated and mined 857 with other new transactions—from A's RBI, B's RBI, and/or other RBIs—into a new block, as understood by a person of ordinary skill in the art. The new block is broadcast 857 across the blockchain network.

All full nodes receive and validate 858 the new block, which is then added to the blockchain maintained by each full node, as understood by a person of ordinary skill in the art.

A's RBI and B's RBI indicate 859 that the status of the conveyance transaction is "Recorded—1 Confirmation," reflecting that the transaction has been recorded in the blockchain.

The next block is mined, broadcast, and validated. A's RBI and B's RBI indicates 860 that the status of the conveyance transaction is "Recorded—2 Confirmations," reflecting that the transaction is effectively an indelible record in the blockchain.

Referring additionally to FIG. 9, an overview diagram of an embodiment of a blockchain of physical asset transactions 901 is shown, using illustrative data. The blockchain is comprised of an ordered sequence of blocks arranged in a reverse linked list—each block is linked to its immediate predecessor. Each block is formally identified by a hash digest and informally identified by a block height. The first block in the blockchain has block height 0 and is informally identified as Block 0; the next block in the blockchain has block height 1 and is informally identified as Block 1.

Block N 911, block N+1 912, and block N+2 913 are a sequence within the blockchain: block N+2 913 is linked to block N+1 912 and block N+1 912 is linked to block N 911. Block M 914 is an arbitrary number of blocks later within the blockchain.

Each block is comprised of a group of transactions. Transactions are identified by their hash digest, produced by a cryptographic hash function of the transaction data structure. The transactions grouped in a block may be unrelated to one another: they may involve different physical assets, they may be registration transactions created by different trusted agents, and they may be conveyance transactions created by different entities. Transactions 921, 922, 923, 924, and 925 are arbitrary transactions involving arbitrary physical assets not shown in overview FIG. 9.

A DSA-RFID tag 971 is attached to physical asset 961. As described earlier, a physically unclonable function (PUF) produces the DSA-RFID private key 972—a unique, unclonable, and permanent value that cannot be observed by any means—only used in calculations performed entirely within the RFID tag. One such calculation produces the DSA-RFID public key 773 using a one-way mathematical function. This calculation is straightforward in this forward direction (producing the public key), while calculation in the reverse direction (re-constructing the private key) is so difficult as to be considered impossible.

Transaction X 931 is the registration transaction for physical asset 961, created by a "registration of physical asset by trusted agent" process 601 involving the physical asset's DSA-RFID tag 971. Transaction X's sourcing transaction field 932 is filled with all 1s (binary) to signify that the physical asset is not included in any previous transactions recorded in the blockchain. The DSA-RFID public key field 973 is produced by a "get public key" process 201, a function of the DSA-RFID private key 972. The DSA-RFID digital signature field 933 is produced by a "generate digital signature" process 301, a function of DSA-RFID private key 972 and transaction X's hash digest.

Transaction Y 941 is a conveyance transaction for physical asset 961, created by a "conveyance of physical asset from entity A to entity B" process 801 involving the physical asset's DSA-RFID tag 971. The sourcing transaction field 942 contains transaction X's hash digest, linking transaction Y 941 to transaction X 931 in ordered sequence. The DSA-RFID public key field 973 is produced by a "get public key" process 201, a function of the DSA-RFID private key 972. The DSA-RFID digital signature field 943 is produced by a "generate digital signature" process 301, a function of DSA-RFID private key 972 and transaction Y's hash digest.

Transaction Z 951 is a conveyance transaction for physical asset 961, created by a "conveyance of physical asset from entity A to entity B" process 801 involving the physical asset's DSA-RFID tag. The sourcing transaction field 952 contains transaction Y's hash digest, linking transaction Z 951 to transaction Y 941 in ordered sequence. The DSA-RFID public key field 973 is produced by a "get public key" process 201, a function of the DSA-RFID private key 972. The DSA-RFID digital signature field 953 is produced by a "generate digital signature" process 301, a function of DSA-RFID private key 972 and transaction Y's hash digest.

Each transaction's DSA-RFID digital signature field is cryptographic proof that the physical asset was present during the transaction. Every transaction's digital signatures are validated by all full nodes, before the transaction is recorded in the blockchain. Every transaction's digital signatures may be independently validated by any entity at any time (the cryptographic property known as non-repudiation).

The blockchain is a trustworthy record of transactions. A linked sequence of transactions is a cryptographic provable record of a physical asset's authenticity and provenance.

Referring additionally to FIG. 10, a flow diagram of an embodiment of a process in which an entity confirms the authenticity and provenance of a physical asset without creating a new transaction is shown, which may be called an "investigate physical asset" process 1001. Entity B may investigate the authenticity and provenance of a physical asset owned by entity A, for informative purposes and/or before acquiring the physical asset in a "conveyance of physical asset from entity A to entity B" process 701.

Entity B selects 1011 "Investigate" on her RFID-blockchain interface (RBI). B's RBI performs 1012 a "get public key" process 201 with the physical asset. The result of the process is a DSA-RFID public key—the robust public identity of the physical asset.

B's RBI produces an arbitrary message and performs 1013 a "generate digital signature" process 301 with the message. The result of the process is a DSA-RFID digital signature. B's RBI independently validates 1014 the DSA- RFID digital signature, using the DSA-RFID public key and the message. If validation of the digital signature does not pass, B's RBI displays 1015 "RFID Integrity Check Failed" and the process terminates.

In one embodiment, a remote entity B does not have direct access to a physical asset held by entity A. In this embodiment, entity B produces an arbitrary message and sends this message to entity A over an open channel (such as email or instant messenger); A's RBI performs a "get public key" process, producing DSA-RFID public key; A's RBI performs a "generate digital signature" process 301 with B's message, producing DSA-RFID digital signature; entity A sends DSA-RFID public key and DSA-RFID digital signature to entity B over an open channel; B's RBI independently validates the DSA-RFID digital signature, using the DSA-RFID public key and her message; if validation of the digital signature does not pass, B's RBI displays "RFID Integrity Check Failed."

B's RBI sends 1016 the DSA-RFID public key to the blockchain network and requests the most recent transaction of the physical asset. B's RBI receives 1017 the latest transaction and saves it in local memory (in the overview depicted in FIG. 9, this would be transaction Z).

B's RBI sends 1018 the sourcing transaction hash (from transaction received in the preceding paragraph) to the blockchain network and requests the identified transaction. B's RBI receives 1019 the transaction and saves it in local memory (in the overview depicted in FIG. 9, this would be transaction Y).

B's RBI continues to "walk back" 1020 through the linked sequence of transactions, until it receives a transaction with a sourcing transaction hash equal to, for example, all 1s (in the overview depicted in FIG. 9, this would be transaction X). B's RBI formats and displays the transactions from local memory, providing cryptographic proof of the physical asset's provenance and authenticity.

The invention claimed is:

1. A method for authentication, the method comprising:
   generating, by a physically unclonable function (PUF) of a radio frequency identification (RFID) tag containing public-key cryptography (PKC) logic and a random number generator, a tag private key, and sending the tag private key from the PUF to the PKC logic;
   creating, by the PKC logic, a tag public key from the tag private key;
   receiving a message and a command to generate a digital signature by the RFID tag;
   generating a nonce value by a random number generator, and sending the nonce value to the PKC logic;
   calculating, by the PKC logic, the digital signature, based upon inputs including the message, the tag private key and the nonce value;
   transmitting the digital signature from the RFID tag in response to the command.

2. The method of claim 1, wherein calculating the digital signature includes performing, by the PKC logic, a digital signature algorithm (DSA).

3. The method of claim 1, wherein calculating the digital signature includes performing, by the PKC logic, an RSA Digital Signature Algorithm.

4. The method of claim 1, wherein calculating the digital signature includes performing, by the PKC logic, an Elliptic Digital Signature Algorithm (ECDSA).

5. The method of claim 1, further comprising recording the public key and digital signature in a blockchain.

6. The method of claim 1, wherein receiving the command and the message by the RFID tag includes receiving a fixed length message.

7. The method of claim 1, further comprising:
   reading, by a RFID-blockchain interface, the tag public key;
   generating an ethereal private key using a random number generator function; and
   calculating an ethereal public key the using the ethereal private key.

8. The method of claim 1, further comprising attaching a physical asset to the RFID tag.

9. A method for authentication, the method comprising:
   controlling a radio frequency identification (RFID) tag containing public-key cryptography (PKC) logic, a random number generator, a tag private key generated by a physically unclonable function (PUF) and a tag public key calculated from the tag private key;
   receiving a message and a command to generate a digital signature by the RFID tag;
   generating a nonce value by a random number generator, and sending the nonce value to the PKC logic;
   calculating, by the PKC logic, the digital signature, based upon inputs including the message, the tag private key and the nonce value; and
   transmitting the digital signature from the RFID tag in response to the command.

10. The method of claim 9, further comprising controlling a physical asset that is physically attached to the RFID tag.

11. The method of claim 9, further comprising:
    receiving a request for the tag public key; and
    transmitting the tag public key from the RFID tag in response to the request.

12. The method of claim 9, further comprising validating the RFID tag, by a RFID-blockchain interface to the RFID tag.

13. The method of claim 12, further comprising recording the validating in a blockchain.

14. An apparatus for authentication, the apparatus comprising:
    a radio frequency identification (RFID) tag, the RFID tag containing:
      a physically unclonable function (PUF) unit that is adapted to generate a tag private key;
      a public-key cryptography (PKC) logic unit that is adapted to create a tag public key from the tag private key and to calculate a digital signal algorithm; and
      a random number generator that is adapted to generate a nonce value that is input by the PKC logic unit to calculate a digital signature.

15. The apparatus of claim 14, wherein the RFID tag is adapted to receive an authentication input, to provide the authentication input to the PKC logic unit, and to transmit at least one of the tag public key and the digital signal in response to providing the authentication input to the PKC logic unit.

16. The apparatus of claim 15, further comprising a RFID-blockchain interface that is adapted to transmit the authentication input to the RFID tag and to receive at least one of the tag public key and the digital signal in response to transmitting the authentication input.

17. The apparatus of claim 14, further comprising a RFID-blockchain interface that is adapted to receive the tag public key and the digital signal from the RFID tag.

18. The apparatus of claim 17, wherein the RFID-blockchain interface is adapted to create a message that is transmitted to the RFID tag, and the RFID tag is adapted to use the message to calculate the digital signature.

19. The apparatus of claim 17, wherein the RFID-blockchain interface is adapted to communicate with a blockchain that records the tag public key and the digital signature.

20. The apparatus of claim 14, further comprising a physical asset to which the RFID tag is physically attached.

\* \* \* \* \*